US005960907A

United States Patent [19]

Chau

[11] Patent Number: 5,960,907

[45] Date of Patent: Oct. 5, 1999

[54] OIL CHANGING SYSTEM

[76] Inventor: Liang Chau, 64 Mamaroneck Rd., Scarsdale, N.Y. 10583

[21] Appl. No.: 08/933,167

[22] Filed: Sep. 18, 1997

[51] Int. Cl.[6] .............................. B65B 1/04; F01M 11/04; F16N 31/00

[52] U.S. Cl. .............................. 184/105.1; 141/98; 141/97; 141/114; 184/106

[58] Field of Search .............................. 184/105.1, 106; 141/98, 114, 248, 331, 340, 341, 342

[56] References Cited

U.S. PATENT DOCUMENTS

| | | | |
|---|---|---|---|
| 2,899,019 | 8/1959 | Colgan . | |
| 3,211,195 | 10/1965 | Porter | 141/331 X |
| 3,354,989 | 11/1967 | Anderson | 180/69.1 |
| 3,899,012 | 8/1975 | Sather | 141/331 |
| 3,973,549 | 8/1976 | Drummond | 184/106 X |
| 4,695,088 | 9/1987 | Jensen | 296/38 |
| 4,697,670 | 10/1987 | Arruda | 184/1.5 |
| 4,800,933 | 1/1989 | Moore et al. | 141/331 X |
| 5,121,776 | 6/1992 | Kovach | 141/98 |
| 5,259,426 | 11/1993 | Burleigh et al. | 141/98 |
| 5,320,145 | 6/1994 | Avino | 141/98 |
| 5,375,862 | 12/1994 | Sirianno | 280/795 |
| 5,381,839 | 1/1995 | Dowd | 141/242 |
| 5,477,897 | 12/1995 | Scofield | 141/98 X |
| 5,762,120 | 6/1998 | Smith | 141/331 X |

FOREIGN PATENT DOCUMENTS 1127787 11/1983 U.S.S.R. .

*Primary Examiner*—John A. Jeffery
*Assistant Examiner*—Colby Hansen
*Attorney, Agent, or Firm*—Our Pal®Asija

[57] ABSTRACT

The system of this invention performs two functions. First draining the dirty oil from the drain plug of the oil pan of the motor vehicle and then using the same device for filling the motor vehicle engine with clean oil. It also comprises a plurality of components. Essentially it comprises a novel oil draining and filling funnel which includes an upper conical tapered fluid receiving member with an opening at the bottom and a long lower central spout. The funnel includes a plurality of magnets arranged about the protruding horizontal circumference of the open top of the of the funnel; an annular adapter collar having a T-shape in cross-section and surrounding and attached to the spout of the funnel, the collar supporting one or more magnets for retaining the spout in position on a metallic container or reservoir; a spout extension member movably mounted through the central spout for slidable movement relative to the upper body of the funnel to displace an upper end of the spout extension between unsealed and sealed positions relative to the upper end of the spout; and a handling member on the lower end of the spout extension member and a nut driver socket on the upper end of the spout extension member for engaging and removing an oil pan drain nut.

11 Claims, 10 Drawing Sheets

OIL CHANGING SYSTEM

RELATED DOCUMENT

This application is based on the concept disclosed in the disclosure document number 408,949 filed Dec. 10, 1996.

BACKGROUND

This invention relates to servicing of engines that use oil or other fluids. More particularly it relates to method devices and systems for changing oil in motor vehicles, motor cycles, lawn mowers sea going vessels etc. It comprises an improved funnel complete with fluid input and drain for the small service operator and DIY (Do-It-Yourself) owner of a motor vehicle without any fuss and muss.

THE PROBLEM

The problem with prior art oil changing systems is that they are bulky, complex, cumbersome, expensive, time consuming and messy and not at all suited for professional engine service operators and Do-It-Yourself owners of a motor vehicle who have the occasional need to change the oil without taking the motor vehicle to specialized oil changing services such as the JIFFY(R) Lube.

Even dealers and oil changing professionals who use oil pumps have need for such a system when the pump fails. This invention solves this problem by providing method, devices and system for changing oil with only intermittent use of one hand and while concurrently tending to other jobs for other customers.

SUMMARY OF THE INVENTION

The system of this invention performs two functions. First draining the dirty oil from the drain plug of the oil pan of the motor vehicle and then using the same device for filling the motor vehicle engine with clean oil. It also comprises a plurality of components.

Essentially it comprises a novel oil draining and filling funnel which includes an upper conical tapered fluid receiving member with an opening at the bottom and a lower central spout having a lower member with an opening and an upper member integrally connected to the open bottom of the fluid receving member. The funnel includes the following improvements.

a) A plurality of magnets arranged about the circumference of the open top of the upper body of the funnel;

b) An annular adapter collar having a T-shape in cross-section and surrounding and attached to the lower central spout of the funnel, the collar supporting one or more magnets for retaining the spout in position on a metallic container or reservoir;

c) A spout extension member movably mounted through the central spout for slidable movement relative to the upper body of the funnel to displace an upper end of the spout extension between unsealed and sealed positions relative to the upper end of the spout; and d) A handling member on the lower end of the spout extension member and a nut driver socket on the upper end of the spout extension member for engaging and removing an oil pan drain nut.

PRIOR ART

A preliminary limited prior art search was conducted and furthermore the inventor is intimately familiar with the prior art. Following are typical examples of the prior art known to the inventor or his attorney arranged in the reverse chronological order for ready reference of the examiner and the reader.

a) U.S. Pat. No. 5,381,839 awarded to Tracy Dowd on Jan. 17, 1995 for "Liquid Dispenser Device"

b) U.S. Pat. No. 5,375,862 granted to John Sirianno for "Oil Drain Bucket Assembly"

c) U.S. Pat. No. 5,320,145 earned by Alan Avino on Jun. 14, 1994 for "Apparatus for Draining Containers and the Like"

d) U.S. Pat. No. 5,121,776 bestowed upon Christopher Kovach on Jun. 16, 1992 for "Oil Drain Bag"

e) U.S. Pat. No. 4,697,670 issued to Michael Arruda on Oct. 6, 1987 for "Waste Oil Collection Device"

f) U.S. Pat. No. 4,695,088 honorably given to Otto Jensen on Sep. 22, 1987 for "Oil Drop Collector"

g) Union of Soviet Socialist Republic Patent SU-1,127,787 honorably given to Chernyshev on Dec. 7, 1984 for "Vehicle Oil Draining Device"

h) U.S. Pat. No. 3,973,549 graced upon Ronald Drummond on Aug. 10, 1976 for "Crankcase Supported Oil Drip Receiver"

i) U.S. Pat. No. 3,354,989 honorably issued to D J Anderson on Nov. 28, 1967 for "Oil Collector and Projecting Magnetic Retention Means Therefor"

j) U.S. Pat. No. 2,899,019 earned by William Colgan on Aug. 11, 1959 for "Oil Catcher and Discharger for a Vehicle"

DISCUSSION OF THE PRIOR ART

1. Colgan (U.S. Pat. No. 2,899,019) discloses an oil catcher and discharger C having a receptacle E swingably mounted at the lower end of a funnel-shaped frame D having an arrangement of magnets 14 mounted in grooves 15 in an upper rim extending around the frame D.

2. Anderson (U.S. Pat. No. 3,354,989) discloses an oil collector having a container 1 in the form of an open mesh basket containing a filling 6 of oil-absorbent material and having magnets 7, 8 to retain the basket in position against a surface from which oil to be absorbed is dripping.

3. Drummond (U.S. Pat. No. 3,973,549) discloses a crankcase-supported oil drip receiver having a cylindrical container B with a pouring spout 16 and being removably supported from the crankcase by magnets 34 vertically adjustably mounted about an upper edge of the container.

4. Chernyshev (SU 1,127,787) discloses a vehicle oil draining device having magnets 14 on a rim of a cup 1 incorporating a drain hose 2 and plug removal spinner 6 and socket 18.

5. Jensen (U.S. Pat. No. 4,695,088) discloses an oil drop collector 10 which includes a central oil accumulation reservoir 11 and a plurality of flexible support arm 22–25 extending in opposite directions outwardly from the reservoir and terminating in magnet attachment elements 31–34.

6. Arruda (U.S. Pat. No. 4,697,670) discloses a waste oil collection device having an upper receptacle 12, a lower support 14 and bosses 26, 28 by which receptacle 12 can be moved to different vertical positions relative to the support 14.

7. Kovach (U.S. Pat. No. 5,121,776) discloses an oil drain bag 10 having an upper flange 28 housing a magnetic ring 18 and a glove bag pouch 31 to receive a hand.

8. Avino (U.S. Pat. No. 5,320,145) discloses a drain apparatus which includes a container 16 with an opening 22 in the bottom and a glove 18 secured to the bottom opening.

9. Sirianno (U.S. Pat. No. 5,375,862) discloses an oil drain bucket assembly which includes a portable frame 12 having a platform to receive a container 44 and upper tube which receives a lower discharge spout tube 38 on an upper conical body 36 of the funnel 34.

10. Dowd (U.S. Pat. No. 5,381,839) discloses a liquid disburser device for simultaneously filling a plurality of containers from a common source. The device has an upper funnel 80, a lower discharge tube 16 and an upper discharge column 18 with a plurality of equally angularly spaced tubular member 26.

Unfortunately none of the prior art devices singly or even in combination provide all of the features and objectives established by the inventor for this system as enumerated below.

OBJECTIVES

1. It is an objective of this invention to provide devices and a system for changing oil in a motor vehicle easy, efficient, simple, convenient, quick, affordable and fun.

2. Another objective of this invention is to provide an oil changing system suitable for all types of engine service operators with occasional need for changing oil and "Do-It-Yourself" user and consumer.

3. Another objective of this invention is that it use little or no additional energy.

4. Another objective of this invention is that it is easy to use by operators of small or weak stature.

5. Another objective of this invention is that its use be intuitive requiring little additional training.

6. Another objective of this invention is that it be physically safe in normal environments as well as accidental situations.

7. Another objective of this invention is that it be environmentally friendly and safe, made from bio-degradable materials to a practical extent.

8. Another objective of this invention is that it meet all federal, state, local and other private standards, guidelines, and recommendations with respect to safety, environment, quality, and energy consumption.

9. Another objective of this invention is that it facilitate unattended operation with occasional use of only one hand, to permit the operator to attend to other activities in parallel.

10. Another objective of this invention is that it be made of modular units easily interchangeable with each other.

11. Another objective of this invention is that it perform the dual function of dirty oil draining and clean oil filling.

12. Another objective of this invention is that the system include a safe procedure for discarding of the dirty oil without adverse affect on the environment.

13. Another objective of this invention is that it be easy to install, de-install, transport and store.

14. Another objective of this invention is that it can be used on any surface almost anywhere even in the field by raising the motor vehicle to an oil pan accessible level.

Other objectives of this invention reside in its simplicity, elegance of design, ease of manufacture, service, use, and even aesthetics as will become apparent from the following brief description of the drawings and concomitant description.

BRIEF DESCRIPTION OF THE DRAWINGS a). FIG. 1 is a three dimensional perspective view of the invention as interfaced to an oil pan of a motor vehicle.

b) FIG. 2 is a front plan view of the invention complete with funnel, spout and magnet with foam around the spout etc.

c). FIG. 3 is a cut away cross section of FIG. 2 front plan view.

d) FIG. 4 is an exploded three dimensional perspective view of the invention in oil drain configuration.

e) FIG. 5 is an exploded three dimensional perspective view of the invention in oil refill configuration.

f) FIG. 6 is a 3D perspective close up view of the conical top funnel of this invention.

g) FIG. 7 shows a top plan view of the FIG. 6.

h) FIG. 8 shows a cut away section of FIG. 6 j) FIG. 9 is a 3D perspective close up view of the invention in oil refill embodiment with interface to the engine block of the motor vehicle.

k) FIG. 10 shows side elevation of spout 255 of funnel 220 to more clearly show how the magnet is held in position by plurality of upper holding points 270 and plurality of lower holding points 275.

DETAILED DESCRIPTION OF THE PREFERRED EMBODIMENT

Figure 1:
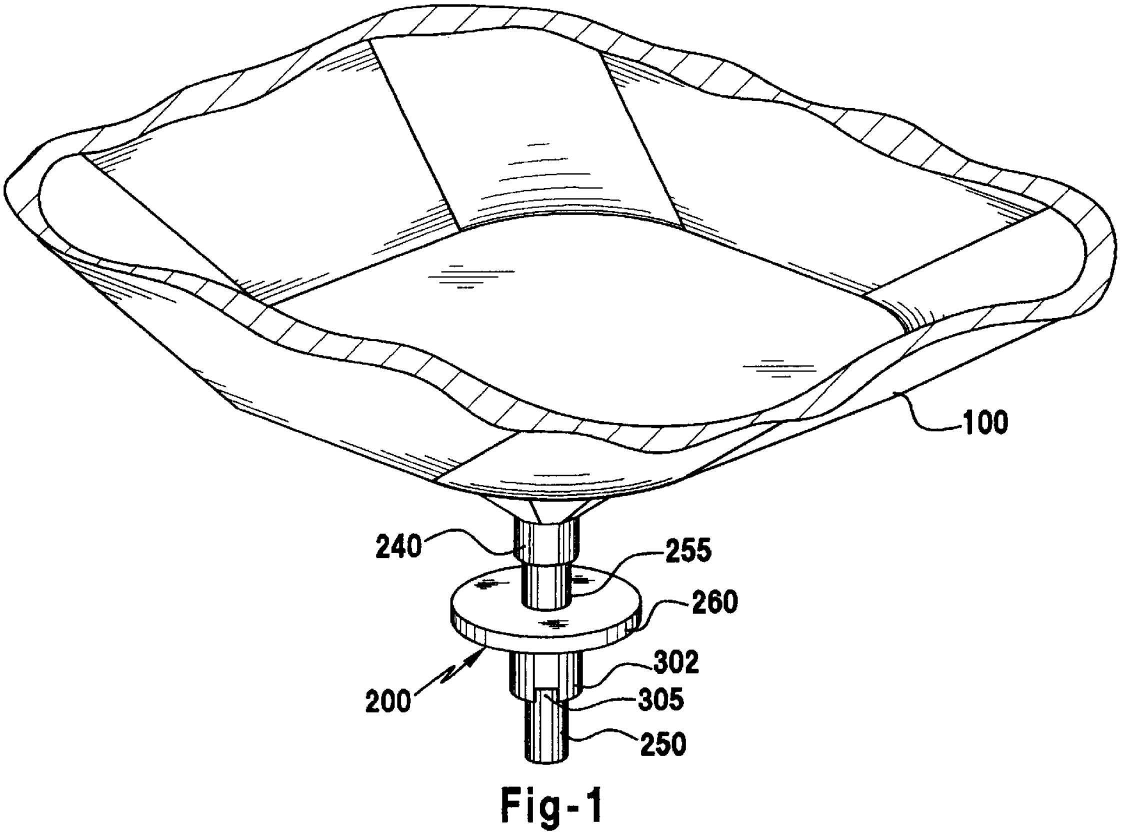

The multipurpose versatile oil changing system 200 of this invention as shown in the drawings wherein like numerals represent like parts throughout the several views, there is generally disclosed in FIG. 1 a three dimensional perspective view of the invention 200 as interfaced to an oil pan 100 of a motor vehicle.

Essentially it comprises a novel oil draining and filling funnel which includes an upper conical tapered fluid receiving member 220 with an opening at the bottom and a lower central spout 255 having a lower member with an opening and an upper member integrally connected to the open bottom of the fluid receiving member 220.

The funnel comprises a plurality of magnets 222 arranged about the protruding member 221 circumference of the open top of the upper body of the funnel. The device also includes an annular adapter collar 260 having a T-shaped (in cross-section) magnetic member 300 surrounding and attached to the lower central spout 255 of the funnel, the collar 260 supporting one or more magnets for retaining the spout in position on a metallic container or reservoir. The spout 255 and collar 260 are made of plastic or other material with some elasticity such that it is subject to compression and expansion by hand pressure to facilitate the addition and removal of a cylindrical dual diameter T shaped magnet over said spout 255 and under said collar 260.

The invention also includes a spout extension member 250 movably mounted through the central spout for slidable movement over the upper body of the funnel to displace an upper end of the spout extension between unsealed and sealed positions relative to the upper end of the spout.

The bottom of the spout extension member 250 also acts as a handle at the lower end of the spout extension member 250. a nut driver socket 210 on the upper end of the spout extension member 250 for engaging and removing an oil pan drain nut 110 is also provided.

Figure 2:
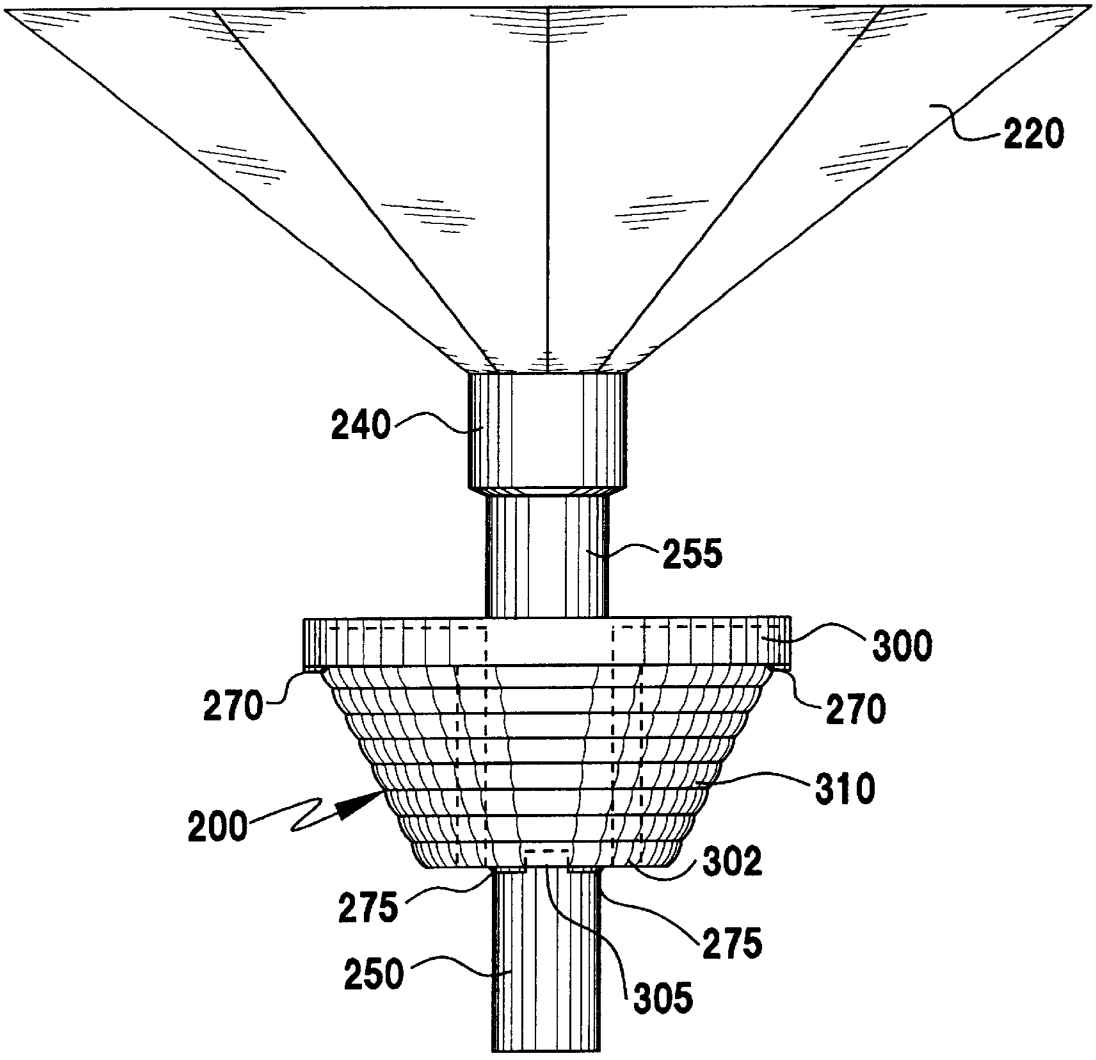
Figure 3:
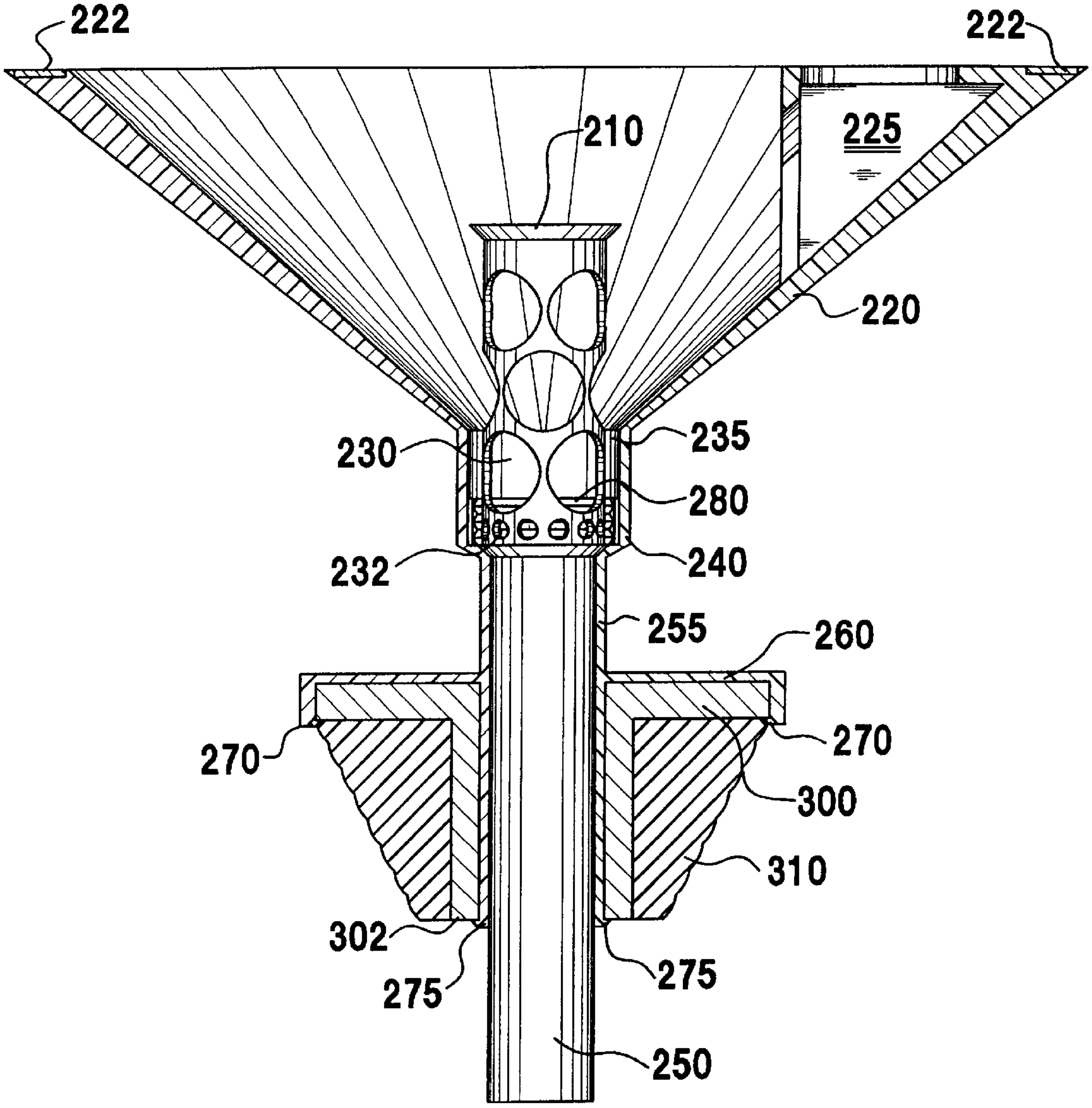
Figure 4:
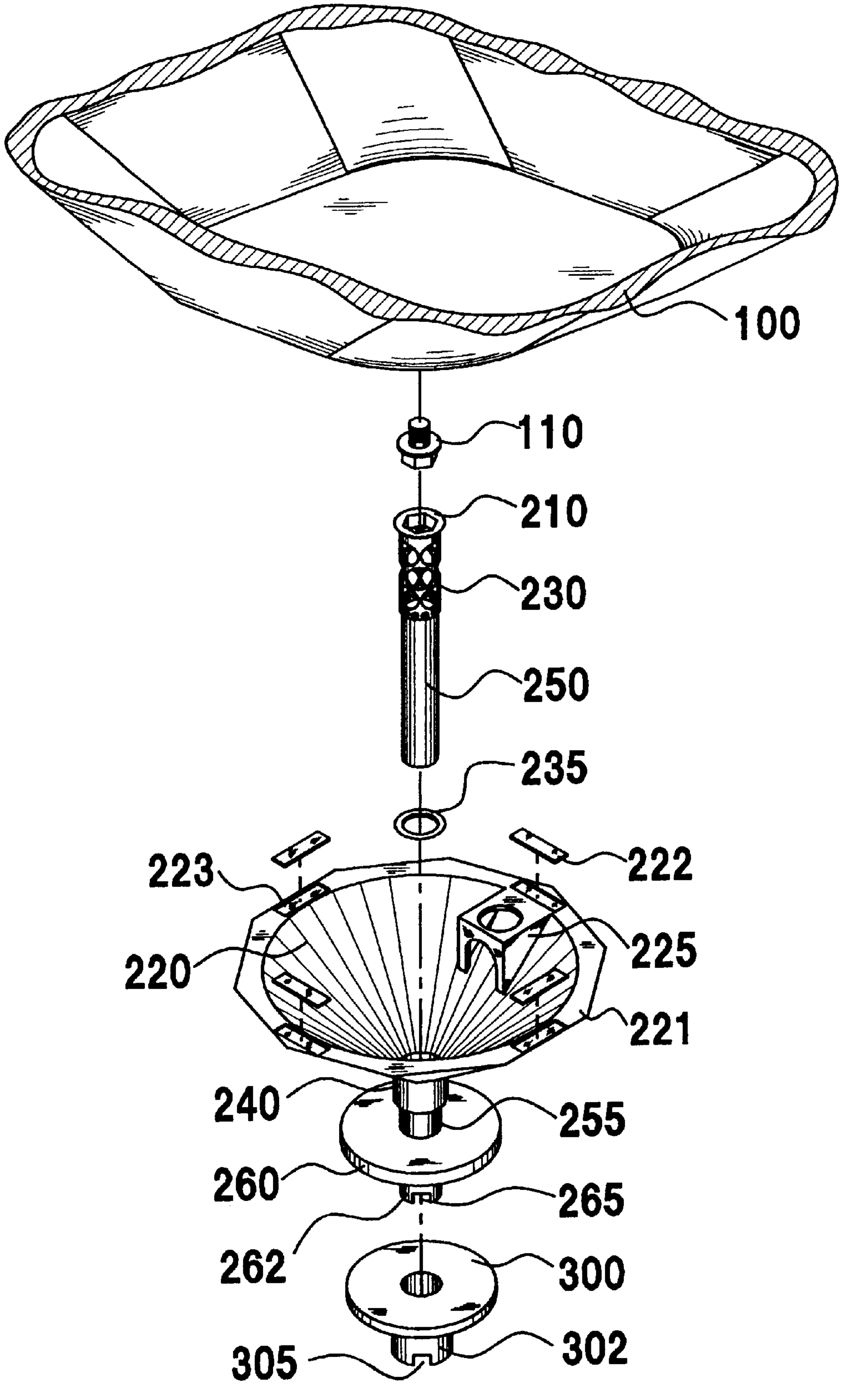
Figure 5:
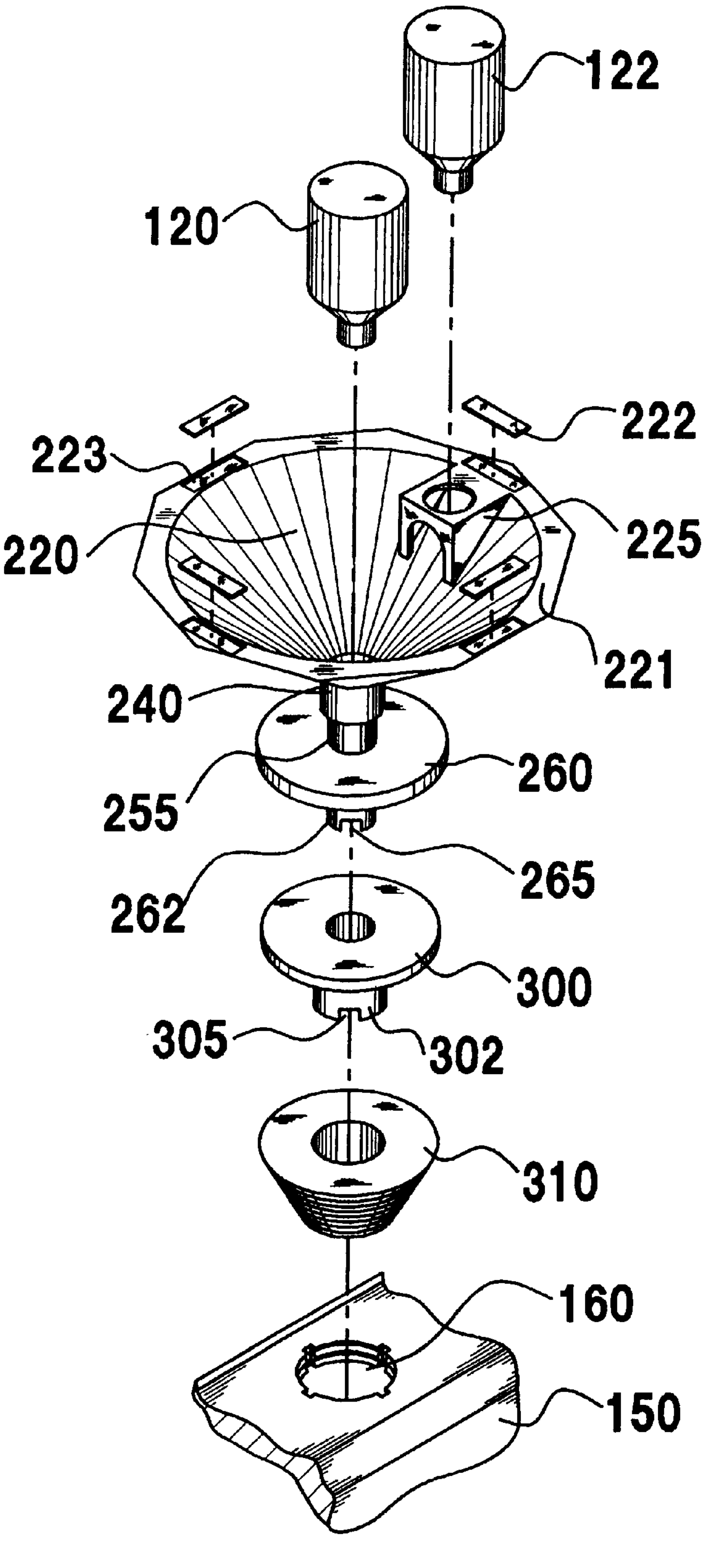

FIG. 2 is a front plan view of the invention complete with funnel 220, spout 240, 255 and magnet 300 and foam padding sponge 310 around a portion of the spout 255. FIG. 3 is a cut away cross section of FIG. 2 front plan view. FIG. 4 is an exploded three dimensional perspective view of the invention in oil drain configuration. FIG. 5 is an exploded three dimensional perspective view of the invention in oil refill configuration.

Figure 6:
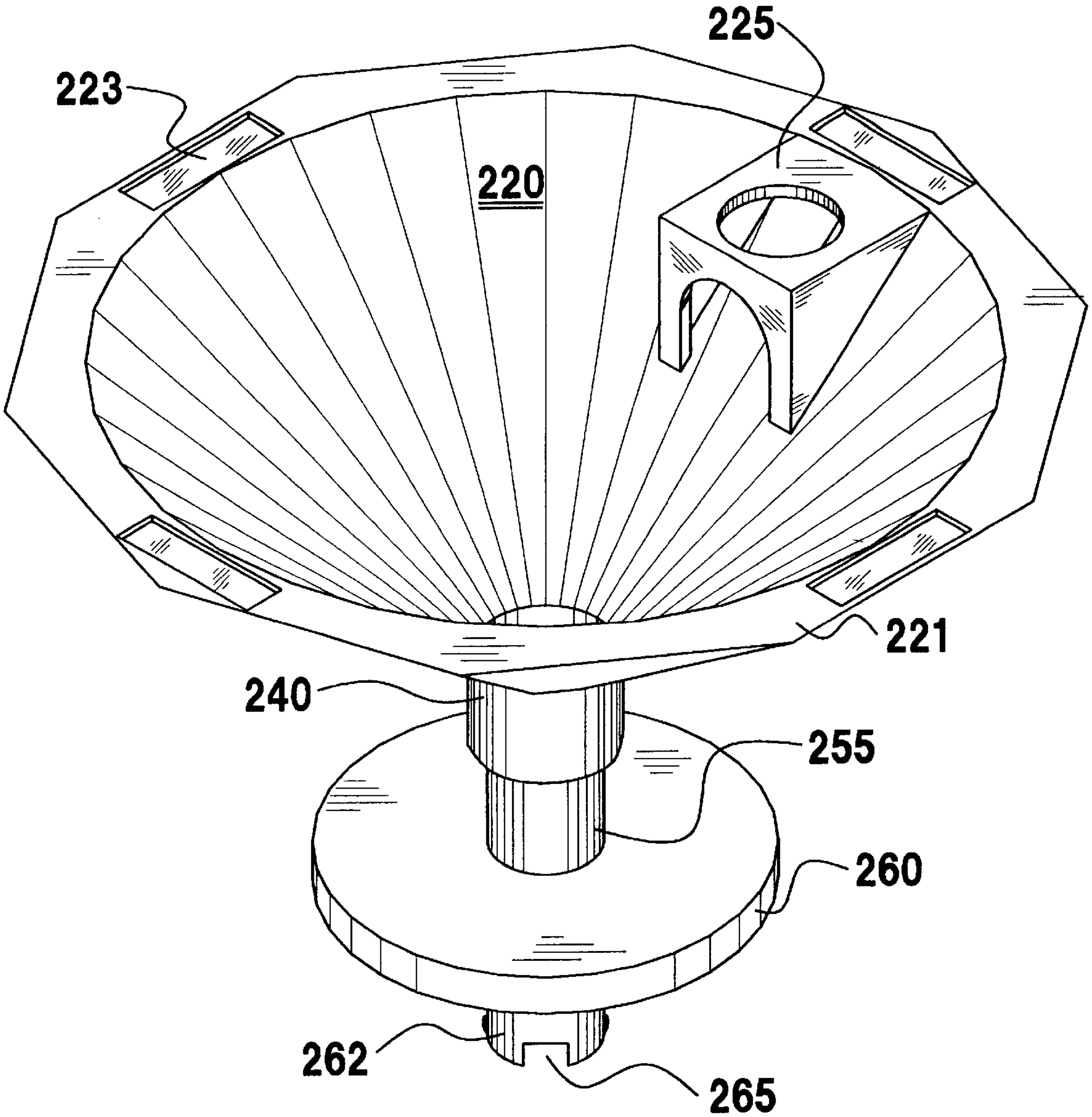
Figure 7:
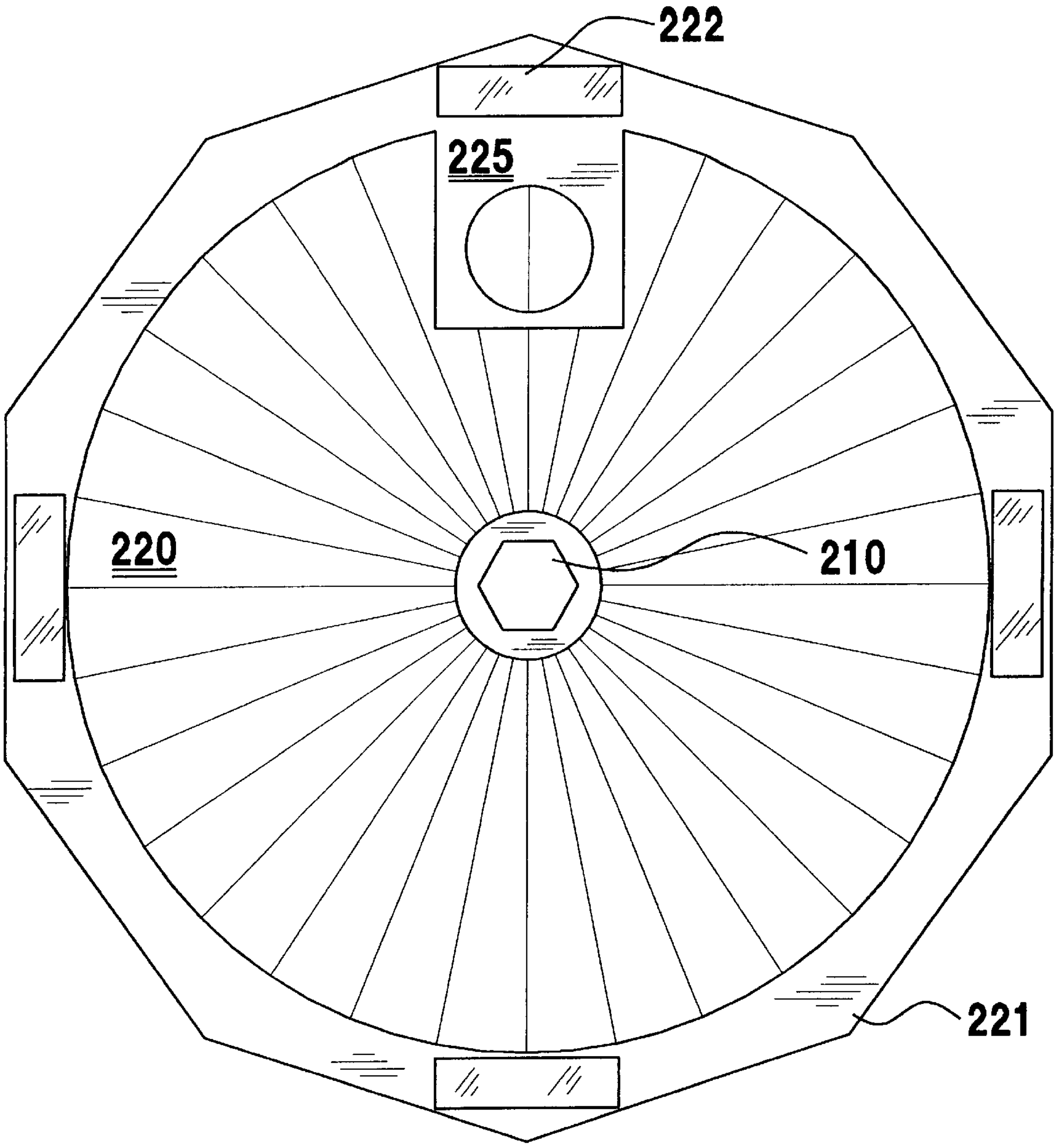
Figure 8:
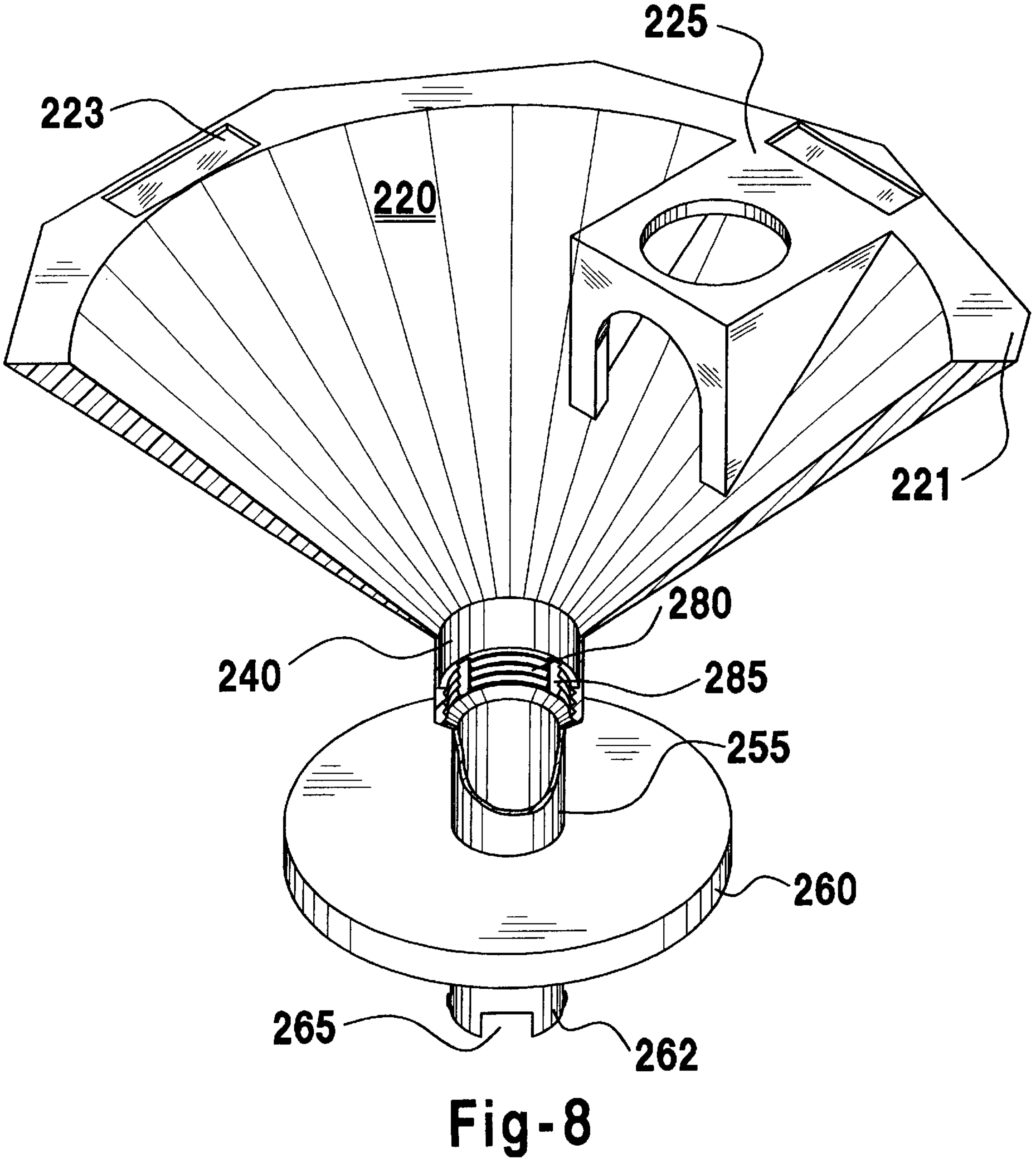
Figure 9:
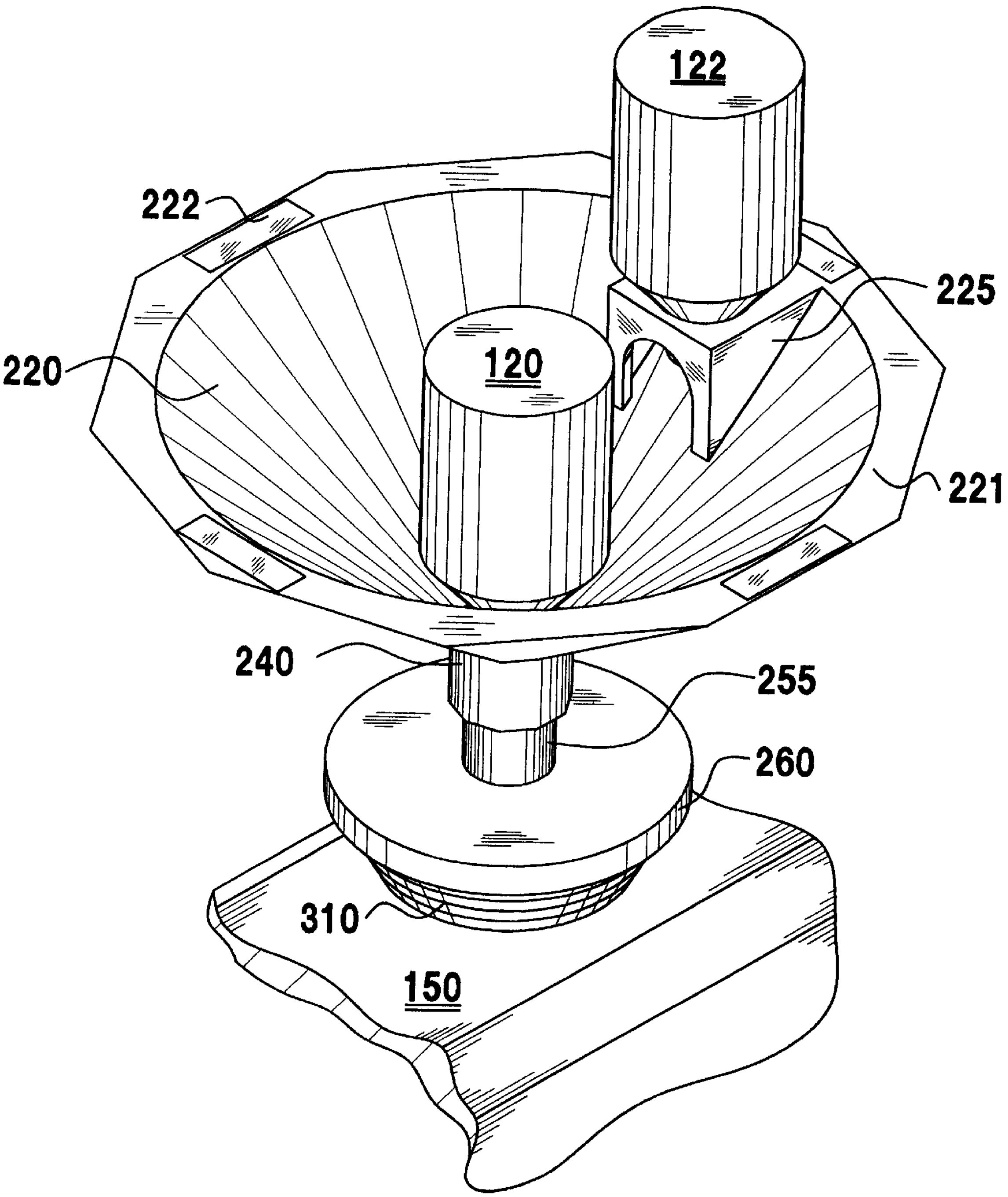

FIG. 6 is a 3D perspective close up view of the conical top funnel of this invention. FIG. 7 shows a top plan view of the FIG. 6. FIG. 8 shows a cut away section of FIG. 6 and FIG. 9 is a 3D perspective close up view of the invention in oil refill embodiment with interface to the engine block of the motor vehicle.

As can be discerned from FIGS. 4 & 5 that the same device is used for both dirty oil draining from the oil pan as well as clean oil addition to the engine block.

FIG. 4 shows the invention as the dirty oil outlet means from the oil pan of the motor vehicle. FIG. 4 also shows a seal 235 which prevents leakage of the oil from the interface between the spout extension member 250 and the narrow portion of the spout 255. In other words the expandable seal 235 prevents oil from the OD, outer diameter, of spout extension member 250, to leak into the ID, inner diameter, of the narrow portion of spout 255.

FIG. 5 shows the invention as an automobile engine cylinder head oil inlet head cap or cover, for oil filling through the device of this invention which includes a funnel shape 220 and a long spout 255 of liquid filling device made of plastic or any other material.

As can be seen in FIG. 8 the threads 280 also have plurality of vertical air passages 285 to permit the exit of air so that oil can flow freely into the engine cylinder head. It should also be noted that due to the threads 280 in the funnel (for the oil can) and the shape of funnel (for the bottle of oil) the operator need not hold the can or the bottle by hand as it will rest vertically and stably. For this reason threads 280 on spout 240 for the oil can are limited to the lower portion only so as to not interfere with the bottle of oil. The funnel 220 also has protruding platform 221 which is integrated with the funnel of this invention. The spout 255 also has a collar 260 and a T-shaped magnetic member 300 and is hollow at center, to accommodate and surround the spout 255. The magnetic member is like half part of the tarpaulin grommet, slidably inserted and mounted around the collar around the funnel spout 260 and the spout termination 262 of this invention. More particularly the magnetic member is a cylindrical dual diameter T shaped in cross sectional view thereof.

Figure 10:
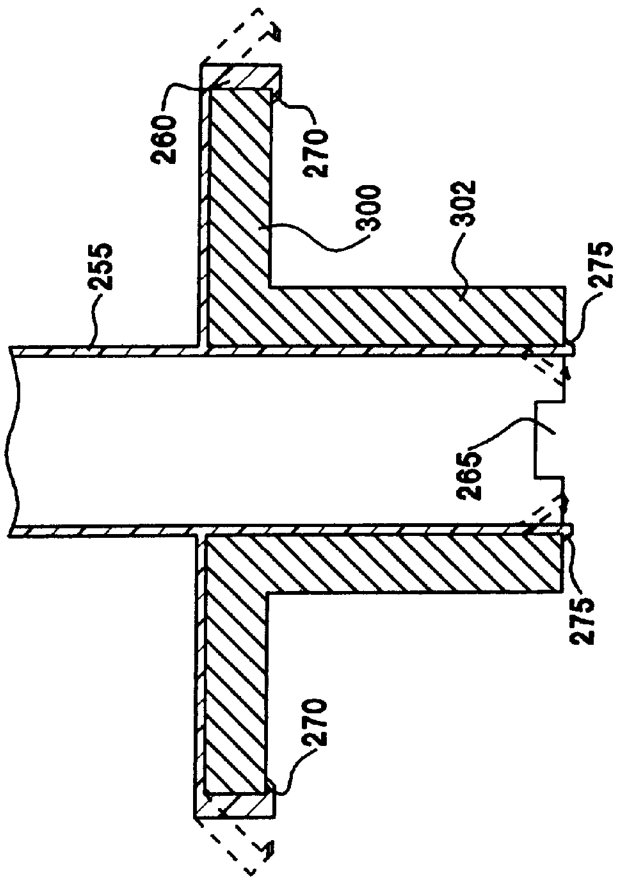
Figure 10:
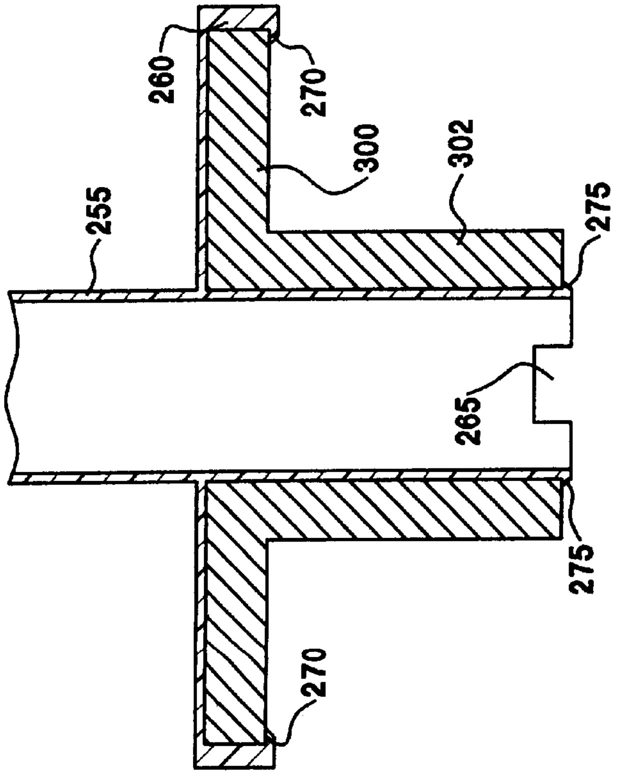

FIG. 10 shows side elevation of spout 255 of funnel 220 to more clearly show how the magnet is held in position by plurality of upper holding points 270 and plurality of lower holding points 275. Due to the triangular shape of the supporting point members, when the magnet is inserted the lower support point triangular members are compressed and move inward, while the upper support point triangular members are pushed to expand and move outward temporarily. When the magnet is in position around the stem of the funnel, the upper and lower triangular support point members return to their natural position.

The unitary funnel 220 also includes, a horizontal projection protruding member 221, a drip oil can support member 225, a long spout 240, a narrow portion of long spout 255, a collar 260 around spout and a spout termination 262.

The inner diameter of spout 240 at the top is larger than the outer diameter of the narrow portion of long spout 255 which in turn is larger than the diameter of the extension member 250 at the bottom.

The spout 262 at the foot area of this device has four openings 265 spaced by equal angular distance of ninety degree from each other. Similarly, the magnet 300 also has at its narrow portion 302 matching four openings 305 spaced by angular distance of ninety degrees from each other. Around the magnet 300 is also a conical foam padding 310 to hold firmly on a non-ferrous engine cylinder head.

It should also be noted that the spout extension member and the drain plug nut do not interfere with the flow of the dirty oil due to the mismatch in the shapes of the funnel, the drain plug nut, the spout extension member top termination, and further in view of the holes provided in the spout extension member for the specific purpose of free flow of even dirty oil.

OPERATION

The operation and use of the oil changing system of this invention is simple and even intuitive. Nonetheless the inventor recommends the following steps.

a) Raise or lift the motor vehicle to an appropriate level.

b) Loosen the drain nut of the oil pan by a spanner (not shown) but do not remove it.

c) Position the transparent funnel under the pan and it will stick to the oil pan because of the plurality of magnets 222 on the protrusion around the top circumference of the funnel.

d) Slide up the spout extension member 210 and position the end thereof to the drain nut 110 on oil pan 100 e) Connect the bottom end of the spout to the drain hose, drain drum or the like reservoir for collecting dirty oil.

f) By maneuvering the spout extension member remove the drain nut. It should be noted that the oil now starts draining and the operator can attend to other chores.

g) When all the dirty oil has drained out dispose of the dirty oil in an environmentally responsible matter and remove the device from under the motor vehicle.

h) Tightly replace the drain nut.

i) Remove spout extension member 210 for filling which is used only for drain configuration.

j) Lower the motor vehicle or drive down from the ramp.

k) Insert the spout of the invention in the opening in the engine block by removing the oil cap.

Note: if the engine cylinder head is ferrous the T shaped magnet will hold the funnel in position directly above the opening in the engine block. If the engine cylinder head is made of non-ferrous material then the conical foam will friction fit in the non ferrous opening of the engine cylinder head.

l) Add a new can of oil in the center of the funnel. Due to the threads in the funnel (for the oil can) and the shape of funnel (for the bottle of oil) the operator need not hold the can or the bottle by hand as it will rest vertically and stably.

It should also be noted that the threads 280 also have plurality of vertical air passages 285 to permit exit of air so oil can flow in freely into the engine cylinder head.

m) Remove the oil can from the center and rest it on the drip oil can support member for exit of last few drops.

n) Repeat steps l) and m) supra until sufficient oil has been added.

o) Remove both cans of oil and discard empty can in an environmentally responsible manner.

p) Remove the device from the engine cylinder head and store appropriately for next use.

o) Replace the engine cylinder head cover or the oil cap.

The inventor has given a non-limiting description of the oil changing system of this invention. Due to the simplicity and elegance of the design of this invention designing around it is very difficult if not impossible. Nonetheless many changes may be made to this design without deviating from the spirit of this invention. Examples of such contemplated variations include the following:

1. The shape and size of the various members and components may be modified.

2. The color, aesthetics and materials may be enhanced or varied.

3. Instead of a mechanical interface an electrical interface may be employed.

4. Additional complimentary and complementary functions and features may be added.

5. A small motor may be attached to reduce the effort required on the part of the user.

6. A gift pack version of the invention may be developed.

7. A more economical version of the device may be adapted with an informational or advertising message for promotional give-aways.

8. The means for holding the oil can or bottle in the funnel may be modified.

9. A different method may be employed for the exiting of air from the engine cylinder head than the vertical air passages in the threads taught by the inventor.

Other changes such as aesthetics and substitution of newer materials as they become available, which substantially perform the same function in substantially the same manner with substantially the same result without deviating from the spirit of the invention may be made.

Following is a listing of the components uses in this embodiment arranged in ascending order of the reference numerals for ready reference of the reader.

100=Oil pan of a motor vehicle

110=Oil pan drain nut

120=New oil can

122=Drip oil can

150=Engine cylinder head

160=Oil Inlet on engine block

200=Oil changing system generally

210=Spout Extension Member with nut driver

220=Funnel

221=Horizontal projection protruding member on funnel

222=Flat magnets on horizontal extension 221 of funnel 220

223=Recess on extension 221 for magnet 222

225=Drip oil can support member

230=Large drain holes in spout extension member

232=Small Holes in spout extension member

235=Expandable Rubber Seal

240=Spout of funnel

250=Spout extension member

255=Narrow portion of long spout

260=Collar around funnel spout

262=Spout termination

265=Holes in spout termination 90 degrees apart around said spout

270=Upper holding triangular support point members for cylindrical dual diameter T shaped magnet

275=Lower holding triangular support point members for cylindrical dual diameter T shaped magnet

280=Threads in spout 240 to hold oil can

285=Vertical air passages in threads 280

302=Narrow part of the magnet

305=Openings on narrow part of cylindrical dual diameter T shaped magnet to align with opening 265 on spout termination 262

310=Cone shaped foam or sponge material around cylindrical dual diameter T shaped magnet to stay firm on non-ferrous engine cylinder head

DEFINITIONS AND ACRONYMS

Great care has been taken to use words with their conventional dictionary definitions. Following definitions are included here for clarification.

3D=Three Dimensional

DIY=Do It Yourself

ID=Inner Diameter or diameter of the circular wire frame generally

Integrated=Combination of two entities to act like one

Interface=Junction between two dissimilar entities

OD=Outer Diameter

Symmetrical=The shape of an object which can be divided into two identical parts along some axis through the object.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefor contemplated that the appended claim(s) cover any such modifications, embodiments as fall within the true scope of this invention.

The Inventor claimed is:

1. A multi-purpose versatile oil changing system for fluid replacement in an engine cylinder head comprising:

a) a funnel which includes an upper conical tapered fluid receiving member with an opening at the bottom and a lower spout;

b) a plurality of magnets arranged about the circumference of the open top of the upper body of said funnel;

c) an annular adapter collar attached to said lower spout of said funnel;

d) a circular magnet connected below said collar around said spout;

e) a conical flexible material member mounted around said circular magnet;

f) a spout extension member movably mounted through said spout;

g) a drip can rest support member connected at the circumference of said funnel; and h) a handling member termination on the lower end of the spout extension member and a nut driver socket termination integrated onto the upper end of the spout extension member for engaging and removing an oil pan drain nut.

2. The multi-purpose versatile oil changing system of claim 1 wherein said flexible material member comprises sponge.

3. The multi-purpose versatile oil changing system of claim 1 wherein said circular magnet is cylindrical dual diameter T shaped.

4. The multipurpose versatile oil changing system of claim 3 wherein said magnet is supported by a plurality of upper holding triangular support point members and a plurality of lower holding triangular support point members incorporated into said funnel.

5. The multi-purpose versatile oil changing system of claim 1 wherein said funnel is transparent.

6. The multi-purpose versatile oil changing system of claim 1 wherein said spout extension member includes plurality of holes for free flow of dirty fluid.

7. The multipurpose versatile oil changing system of claim 6 which includes a seal between said spout extension member and said lower spout.

8. The multipurpose versatile oil changing system of claim 1 which includes plurality of threads on inner diameter of said spout.

9. The multipurpose versatile oil changing system of claim 8 wherein said threads include a plurality of vertical air passages for the exit of air from the engine cylinder head.

10. The multipurpose versatile oil changing system of claim 1 wherein said magnet and said lower spout of said funnel each have plurality of openings aligned to each other.

11. The multipurpose versatile oil changing system of claim 10 wherein said plurality of openings are four openings spaced angularly equidistant at ninety degree from each other.

* * * * *